A. E. FORSETH.
ANTISKID CHAIN HOOK.
APPLICATION FILED AUG. 20, 1921.
1,415,328. Patented May 9, 1922.
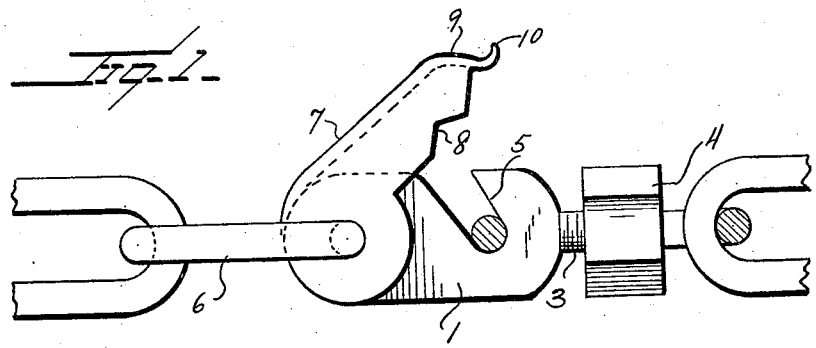
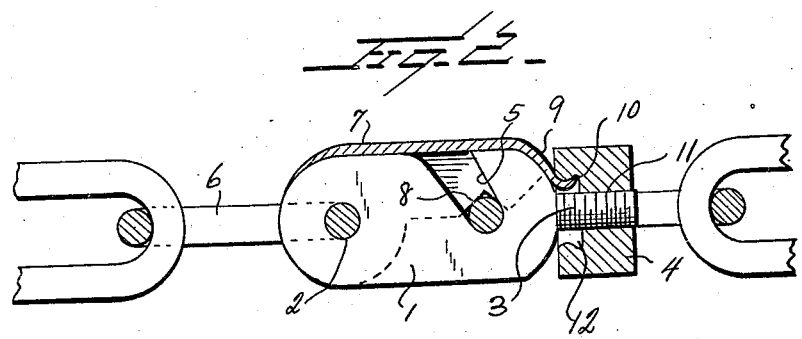
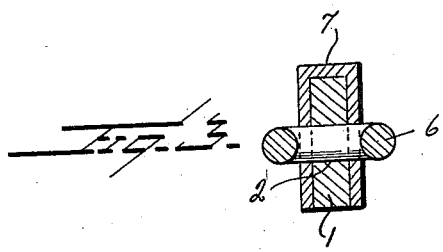
Inventor
A. E. Forseth
By Watson E. Coleman
Attorney

UNITED STATES PATENT OFFICE.

ALFRED E. FORSETH, OF HARDWICK, MINNESOTA.

ANTISKID-CHAIN HOOK.

1,415,328.   Specification of Letters Patent.   Patented May 9, 1922.

Application filed August 20, 1921. Serial No. 493,945.

*To all whom it may concern:*

Be it known that I, ALFRED E. FORSETH, a citizen of the United States, residing at Hardwick, in the county of Rock and State of Minnesota, have invented certain new and useful Improvements in Antiskid-Chain Hooks, of which the following is a specification, reference being had to the accompanying drawings.

This invention relates to chain hooks and more particularly to that type used to connect the separate ends of automobile antiskid chains.

In the devices as at present used, the hook portions are provided with a diagonal notch and the free or opposite end of the chain is locked in the notch by a keeper which straddles the hook and is held in position thereon by friction. Frequently these keepers get loose by reason of back pressure and open up to such a degree that the chain link becomes disconnected from the hook with consequent loss of the chain or what is possibly worse, having the chain wind around the hub of the wheel, tearing out the spokes and doing other damage.

It is the object of this invention to avoid the aforesaid difficulties and to provide a simple and efficient lock which positively prevents the disengagement of the chain link from the hook.

Another object of the invention is the provision of a hook of this character having a keeper which acts upon back pressure of the chain there against to hold the securing nut against rotation.

Further objects of the invention will appear as the following specific description is read in connection with the accompanying drawing which forms a part of this application, and in which:

Figure 1 is a side elevation of the hook with the keeper in raised position,

Figure 2 is a longitudinal sectional view with the keeper in locked position, and Figure 3 is a detailed vertical sectional view.

Referring more particularly to the drawing, 1 represents a flat body provided with a chain receiving aperture 2 at one end, and at its opposite end with a reduced longitudinal extension 3 threaded to receive the locking nut 4. Intermediate the length of the body I form a diagonal notch 5 as in the present type of chain hook which is adapted to receive the free end of the tire chain as is well understood.

The aperture 2 receives the end link of the chain indicated at 6, which acts as a pivot for the keeper generally shown at 7. This keeper is preferably struck up from a single sheet of material and bent upon itself so as to produce at its rear end a substantially U-shaped form adapted to straddle the body, as shown in Figure 3, and received through openings formed therein, the link 6. Adjacent the forward end of the keeper I provide a substantially triangular notch 8 adapted to receive the link which is fitted into the notch 5. Forward of the notch 8, the keeper is formed into a nut engaging tongue 9 having an upward extension 10 for a purpose to be hereinafter described.

The nut 4 is provided, as is usual, with a centrally threaded opening 11 arranged to receive the threaded extension 3, and adjacent the inner edge of the nut, the opening 11 is enlarged to provide an annular groove 12 arranged to receive the upward extension 10 on the tongue 9.

In connecting the free ends of the chain, the link on the opposite end from the hook is inserted into the notch 5 and the keeper thrown downwardly so that the link lies in the notch 8. In this position, the tongue 9 rests upon the extension and in position to allow the nut to pass over the same. The nut is then screwed up on the extension and when fully seated, the upward extension 10 will be in position to engage within the groove 12 upon any backward pressure being exerted upon the link against the keeper.

It is to be noted that when any backward pressure on the link does exist, the extension 10 of the tongue 9 will engage in the groove 12 with considerable pressure upon the walls thereof and prevent any accidental rotation of the nut.

It is of course possible to make the tongue 9 resilient and I preferably do have the same made of resilient material with the entrance into the groove 12 slightly tapered so that the extension 10 will snap into the groove when the nut is fully seated. In this manner the tongue 9 always produces a pressure against the nut to prevent its rotation.

I claim:

1. An anti-skid chain hook comprising a body having a link receiving notch therein, a longitudinal threaded extension on the body, a notched keeper pivoted upon the body and adapted to hold a link within the notch, a curved spring tongue on the free end of the keeper, and a nut threaded on the extension and having one face formed with an under cut groove conformingly engaging upon said tongue.

2. An anti-skid chain hook comprising a body having a notch therein, a longitudinal threaded extension on the body, a notched keeper pivoted to the body and adapted to hold a link within the notch, a spring tongue on the keeper, and a nut threaded on the extension and having an internal groove adapted to receive the spring tongue, said spring tongue arranged to hold the nut against rotation.

In testimony whereof I hereunto affix my signature.

ALFRED E. FORSETH.